US011852257B2

(12) United States Patent
Bae et al.

(10) Patent No.: US 11,852,257 B2
(45) Date of Patent: Dec. 26, 2023

(54) VALVE DEVICE

(71) Applicant: SAMSUNG ELECTRONICS CO., LTD., Suwon-si (KR)

(72) Inventors: Jungwook Bae, Suwon-si (KR); Kookjeong Seo, Suwon-si (KR); Heemoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 17/536,584

(22) Filed: Nov. 29, 2021

(65) Prior Publication Data
US 2022/0163129 A1    May 26, 2022

Related U.S. Application Data

(63) Continuation of application No. PCT/KR2021/095102, filed on Nov. 11, 2021.

(30) Foreign Application Priority Data

Nov. 26, 2020   (KR) ...................... 10-2020-0161550

(51) Int. Cl.
*F16K 27/02*    (2006.01)
*F16K 31/04*    (2006.01)
(Continued)

(52) U.S. Cl.
CPC ........ *F16K 27/0263* (2013.01); *F16K 11/074* (2013.01); *F16K 31/043* (2013.01);
(Continued)

(58) Field of Classification Search
CPC .. F16K 27/0263; F16K 31/043; F16K 11/074; F16K 11/10; F16K 15/00;
(Continued)

(56) References Cited

U.S. PATENT DOCUMENTS

| 6,491,063 B1 * | 12/2002 | Benatav .................. F25B 41/26 |
| | | 137/625.43 |
| 6,591,619 B2 | 7/2003 | Kaneko et al. |
| | (Continued) | |

FOREIGN PATENT DOCUMENTS

| JP | 9-292164 A | 11/1997 |
| JP | 4180786 | 11/2008 |
| | (Continued) | |

OTHER PUBLICATIONS

International Search Report dated Mar. 7, 2022 in PCT Application No. PCT/KR2021/095102.

*Primary Examiner* — Matthew W Jellett
*Assistant Examiner* — Christopher D Ballman
(74) *Attorney, Agent, or Firm* — STAAS & HALSEY LLP

(57) ABSTRACT

A valve device includes a case having an opened bottom portion and a receiving space formed therein, a base plate covering the open bottom of the case, a flow-in pipe coupled to the base plate to bring in a refrigerant, a boss installed to the base plate and including a plurality of refrigerant flow-in/out holes through which the introduced refrigerant flows in/out, a plurality of flow-in/out pipes coupled to the plurality of refrigerant flow-in/out holes and through which the introduced refrigerant flows in/out, and a pad arranged on the boss and including an open cavity formed therein to selectively opening one of the plurality of refrigerant flow-in/out holes and a connection cavity formed therein to selectively connecting two of the plurality of refrigerant flow-in/out holes.

15 Claims, 20 Drawing Sheets

(51) Int. Cl.
*F16K 31/53* (2006.01)
*F16K 11/074* (2006.01)
*F25B 41/20* (2021.01)
*F16K 11/10* (2006.01)
*F16K 15/00* (2006.01)
*F25B 47/00* (2006.01)
*F25D 21/04* (2006.01)

(52) U.S. Cl.
CPC ............ *F16K 31/535* (2013.01); *F16K 11/10* (2013.01); *F16K 15/00* (2013.01); *F25B 41/20* (2021.01); *F25B 47/00* (2013.01); *F25B 47/006* (2013.01); *F25D 21/04* (2013.01)

(58) Field of Classification Search
CPC .......... F25B 41/20; F25B 41/26; F25B 47/00; F25B 47/006; F25D 21/04
See application file for complete search history.

(56) References Cited

U.S. PATENT DOCUMENTS

| | | | | |
|---|---|---|---|---|
| 6,880,802 B2* | 4/2005 | Hara | ...................... | F16K 31/041 251/339 |
| 6,926,250 B1* | 8/2005 | Hashimoto | ........... | F16K 31/043 251/129.11 |
| 7,284,571 B2* | 10/2007 | Ozawa | .................. | F16K 31/045 137/625.46 |
| 7,437,888 B2 | 10/2008 | Son et al. | | |
| 7,793,915 B2* | 9/2010 | Ozawa | .................. | F16K 31/043 251/211 |
| 9,746,087 B2* | 8/2017 | Yokoe | .................. | F16K 31/535 |
| 9,903,479 B2* | 2/2018 | Yokoe | ...................... | F25B 41/35 |
| 10,781,932 B2* | 9/2020 | Yokoe | .................. | F16K 31/043 |
| 10,900,578 B2* | 1/2021 | Yokoe | .................. | F16K 31/535 |
| 11,098,815 B2* | 8/2021 | Yokoe | .................. | F16K 31/047 |
| 11,143,330 B2* | 10/2021 | Yokoe | .................. | F16K 11/074 |
| 11,156,306 B2* | 10/2021 | Yokoe | .................. | H02K 1/2733 |
| 11,209,097 B2* | 12/2021 | Yokoe | .................. | F16K 31/535 |
| 2012/0080623 A1 | 4/2012 | Kang | | |
| 2015/0276070 A1* | 10/2015 | Yokoe | .................. | F16K 31/041 251/305 |
| 2019/0162314 A1* | 5/2019 | Yokoe | ...................... | F16K 3/08 |

FOREIGN PATENT DOCUMENTS

| | | |
|---|---|---|
| JP | 2012-37224 A | 2/2012 |
| JP | 2015-218894 A | 12/2015 |
| JP | 2016-205476 | 12/2016 |
| JP | 6306758 | 4/2018 |
| KR | 20-1996-0003318 Y1 | 4/1996 |
| KR | 10-0616637 B1 | 8/2006 |
| KR | 10-2007-0042018 | 4/2007 |
| KR | 10-2012-0035335 | 4/2012 |
| KR | 10-1394329 B1 | 5/2014 |
| KR | 10-2016-0058063 | 5/2016 |
| KR | 10-1622727 B1 | 5/2016 |
| KR | 10-2017-0065839 | 6/2017 |
| KR | 10-1753487 | 7/2017 |
| KR | 10-1853696 B1 | 5/2018 |

* cited by examiner

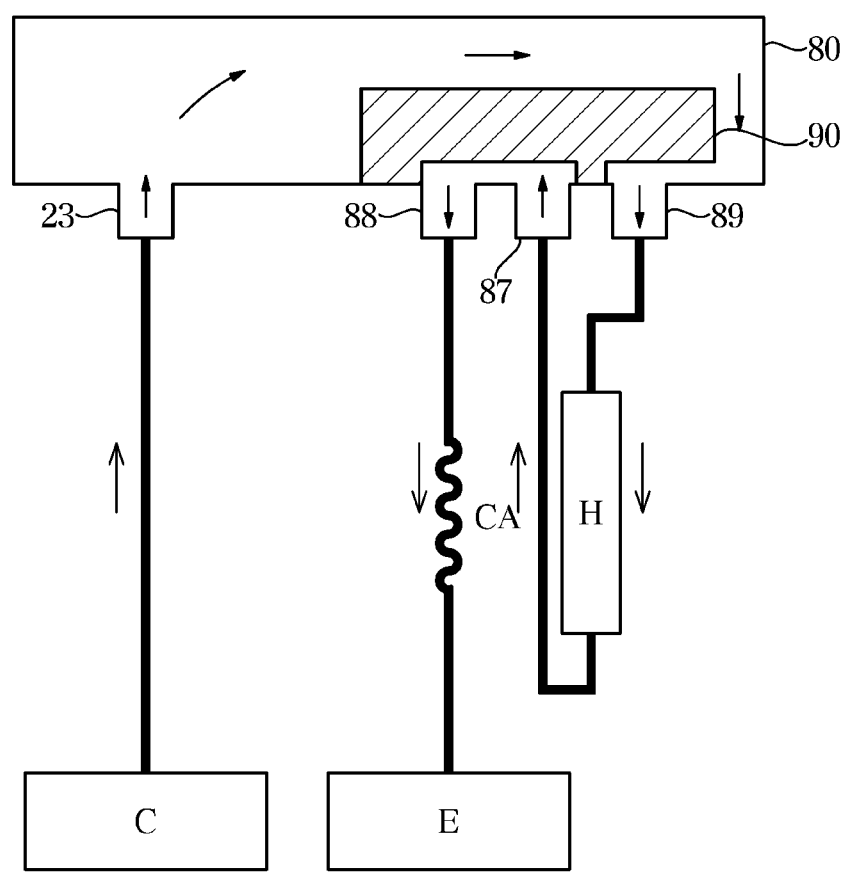

VALVE DEVICE

CROSS-REFERENCE TO RELATED APPLICATIONS

This application is a Continuation of PCT Application No. PCT/KR2021/095102, filed Nov. 11, 2021, which claims the priority benefit of Korean Application No. 10-2020-0161550, filed Nov. 26, 2020, the contents of both of which are incorporated by reference herein in their entirety.

BACKGROUND

1. Field

The disclosure relates to a valve device with an enhanced structure.

2. Description of Related Art

In a general refrigeration device to which a refrigeration cycle is applied, a refrigerant produces cold air by circulating a compressor, a condenser, an expansion device, and an evaporator.

The refrigerant compressed in the compressor is sent to the condenser to be condensed, and the refrigerant condensed in the condenser is sent to the expansion device to be expanded. The refrigerant expanded in the expansion device is sent to the evaporator, and produces cold air through heat exchange in the evaporator.

In a case of a refrigerator, the refrigerant condensed in the condenser is sent to the expansion device by a refrigerant tube, in which case the refrigerant condensed in the condenser is sent to the expansion device directly or via a hot pipe through a branched tube branched from the refrigerant tube.

The hot pipe is a pipe installed to prevent dew formation caused in a gasket portion of a refrigerator door, which is a portion vulnerable to the temperature in the refrigerator. Specifically, the high-temperature refrigerant of a high-pressure part of the refrigeration cycle passes the hot pipe to prevent dew formation in the gasket portion of the refrigeration door. The hot pipe only needs to maintain the temperature above the dew point based on humidity in the outside air, but when the temperature remains above the dew point in the refrigerator, it may act as a thermal load in the refrigerator and thus, increase power consumption of the refrigerator.

Accordingly, depending on the driving condition, the refrigerant condensed in the condenser is sent to the expansion device through the hot pipe or sent directly to the expansion device without going through the hot pipe. When there is no need to send the refrigerant to the hot pipe, the refrigerant needs to be prevented from being sent to the branched tube connected to the hot pipe, thereby increasing energy efficiency. For this, a three-way valve is installed at a portion in which the branched tube is branched from the refrigerant tube.

However, some of the refrigerant sent directly to the expansion device by the three-way valve without going through the hot pipe flow into the branched tube at a point, at which the branched tube and the refrigerant tube meet, and is then sent to the hot pipe. That is, some of the refrigerant flows backward to the hot pipe from the point at which the branched tube and the refrigerant tube meet. To prevent this, there is a need to install a check valve between the point at which the branched tube and the refrigerant tube meet and the hot pipe, or install an additional three-way valve at the point at which the branched tube and the refrigerant tube meet, which incurs additional expenses. Furthermore, the check valve may be less effective because it does not have a perfect anti-backflow function. In addition, when the additional three-way valve is installed, a problem of having to reserve an installation space for the three-way valve and a complicated pipe connection problem may occur.

SUMMARY

An aspect of the disclosure provides a valve device with an enhanced structure capable of preventing a refrigerant from flowing backward to a hot pipe when the refrigerant condensed in a condenser is directly sent to an expansion device without going through the hot pipe.

According to an embodiment of the disclosure, a valve device includes a case having an opened bottom portion and a receiving space formed therein, a rotor arranged in the receiving space and including a rotor shaft, a pinion gear coupled to the rotor shaft and to be rotated along with the rotor, a pad gear arranged on a side of the pinion gear to be engaged with the pinion gear, and to be rotated by the pinion gear, the pad gear including a pad valve shaft, which is a rotation shaft of the pad gear, a base plate to cover the open bottom portion of the case, a flow-in pipe coupled to the base plate to introduce in a refrigerant to the receiving space therethrough, a boss installed to the base plate and including a plurality of refrigerant flow-in/out holes through which the introduced refrigerant flows in/out, a plurality of flow-in/out pipes coupled to the plurality of refrigerant flow-in/out holes and through which the introduced refrigerant flows in/out, and a pad arranged on the boss to be coupled to the pad valve shaft, the pad including an open cavity formed therein to selectively open one of the plurality of refrigerant flow-in/out holes and a connection cavity formed therein to selectively connect two of the plurality of refrigerant flow-in/out holes.

The boss may include a plurality of insertion holes to which the plurality of flow-in/out pipes are inserted, and the plurality of insertion holes may be formed to be connected to the plurality of refrigerant flow-in/out holes.

The open cavity and the connection cavity may be formed to each have a shape of a groove sunken upward from a bottom surface of the pad.

The open cavity may be formed to extend to an edge of the pad in a radial direction of the pad.

The connection cavity may connect two adjacent refrigerant flow-in/out holes among the plurality of refrigerant flow-in/out holes.

The plurality of refrigerant flow-in/out holes may include a first refrigerant flow-in/out hole, and a second refrigerant flow-in/out hole, a third refrigerant flow-in/out hole, and a fourth refrigerant flow-in/out hole formed in positions sequentially rotated 90 degrees counterclockwise starting from the first refrigerant flow-in/out hole.

The plurality of flow-in/out pipes may include a first flow-in/out pipe coupled to the first refrigerant flow-in/out hole, a second flow-in/out pipe coupled to the second refrigerant flow-in/out hole, a third flow-in/out pipe coupled to the third refrigerant flow-in/out hole, and a fourth flow-in/out pipe coupled to the fourth refrigerant flow-in/out hole.

The flow-in pipe may be coupled to an outlet pipe of the condenser to receive a refrigerant from the condenser therethrough, the second flow-in/out pipe may be coupled to an entrance of the hot pipe, the third flow-in/out pipe may be coupled to an exit of the hot pipe, and the first and fourth flow-in/out pipes may be coupled to a capillary tube.

When the open cavity is located in between the first and fourth refrigerant flow-in/out holes, the plurality of refrigerant flow-in/out holes may all be closed, which corresponds to a valve-closed state.

When the pad is rotated 45 degrees counterclockwise around a center of the boss, the first refrigerant flow-in/out hole may be opened by the open cavity, the fourth refrigerant flow-in/out hole may be closed, and the second and third refrigerant flow-in/out holes may be connected by the connection cavity.

The refrigerant flowing into the receiving space through the flow-in pipe flows out to the first flow-in/out pipe through the first refrigerant flow-in/out hole and flows into the capillary tube, and the fourth refrigerant flow-in/out hole may be closed, thereby closing an outflow into the fourth flow-in/out pipe.

When the pad is rotated 135 degrees counterclockwise around the center of the boss, the second refrigerant flow-in/out hole may be opened by the open cavity, the first refrigerant flow-in/out hole may be closed, and the third and fourth refrigerant flow-in/out holes may be connected by the connection cavity.

The refrigerant flowing into the receiving space through the flow-in pipe flows out to the second flow-in/out pipe through the second refrigerant flow-in/out hole and flows into the third flow-in/out pipe through the hot pipe, and the refrigerant flowing into the third flow-in/out pipe flows out to the fourth flow-in/out pipe through the fourth refrigerant flow-in/out hole connected to the third refrigerant flow-in/out hole by the connection cavity and flows into the capillary tube.

One end of the hot pipe is an entrance where the refrigerant from the receiving space flows into and the other end of the hot pipe is an exit where the refrigerant in the hot pipe flows out.

A valve device comprises a case having a receiving space formed therein, a flow in hole, and a boss hole, a rotor installed in the receiving space and including a rotor shaft, a pinion gear coupled to the rotor shaft and to be rotated by the rotor, a pad gear engaged with the pinion gear to be rotated with the pinion gear, the pad gear including a pad valve shaft, a flow-in pipe coupled to the flow-in hole to introduce a refrigerant to the receiving space therethrough, a boss installed to the boss hole and including a plurality of flow-in/out holes, a plurality of flow-in/out pipes respectively coupled to the plurality of refrigerant flow-in/out holes and through which the introduced refrigerant flows in/out, and a pad coupled to the pad gear so that the pad is rotatable with respect to the boss to selectively open or close the plurality of flow-in/out holes, the pad including an open cavity formed therein to selectively open one of the plurality of refrigerant flow-in/out holes and a connection cavity formed therein to selectively connect two of the plurality of refrigerant flow-in/out holes.

According to embodiments of the disclosure, backflow of a refrigerant may be prevented with a single valve device without extra installation of a check valve or another valve device, thereby eliminating the need for securing space to install the valve device and minimizing an increase in additional expenses.

BRIEF DESCRIPTION OF DRAWINGS

FIG. 20 is a cross-sectional view schematically illustrating a plurality of refrigerant flow-in/out holes with a third refrigerant flow-in/out hole opened by a pad and first and second refrigerant flow-in/out holes connected by the pad, according to another embodiment of the disclosure.

DETAILED DESCRIPTION

Figure 1:
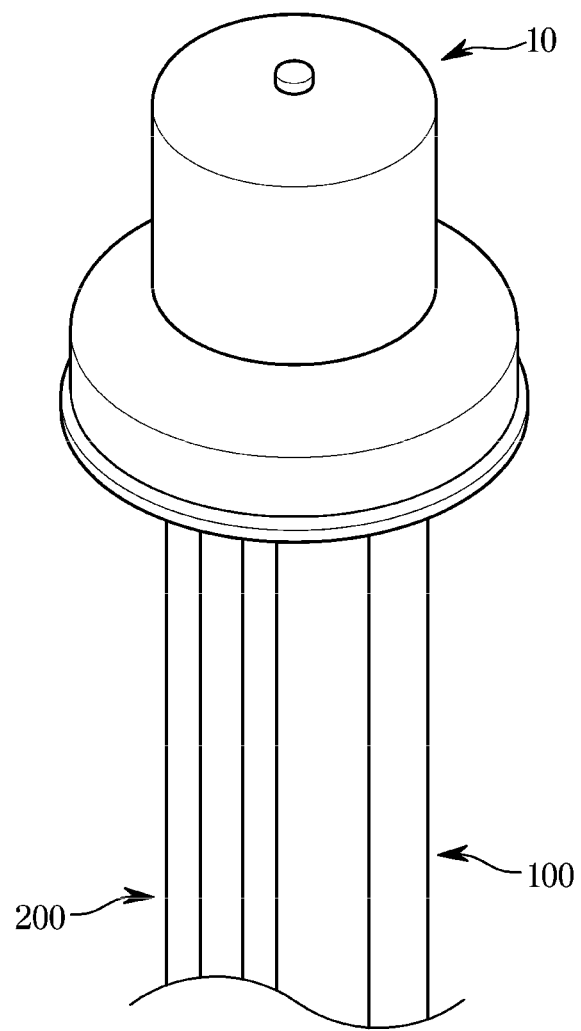
FIG. 1 is a perspective view of a valve device, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Embodiments of the present disclosure will now be described in detail with reference to accompanying drawings.

Figure 2:
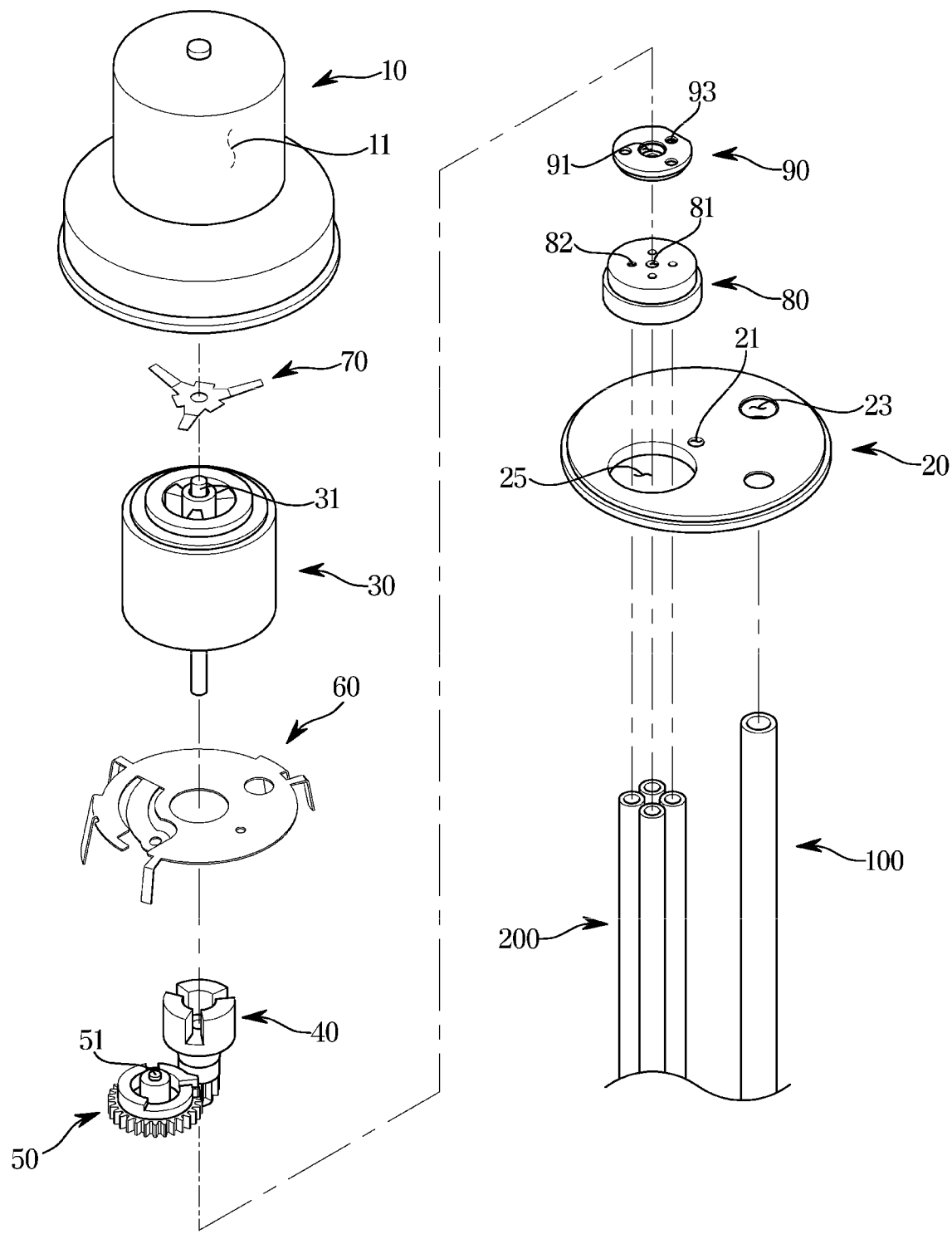
FIG. 2 is an exploded perspective view of a valve device, according to an embodiment of the disclosure.
Figure 3:
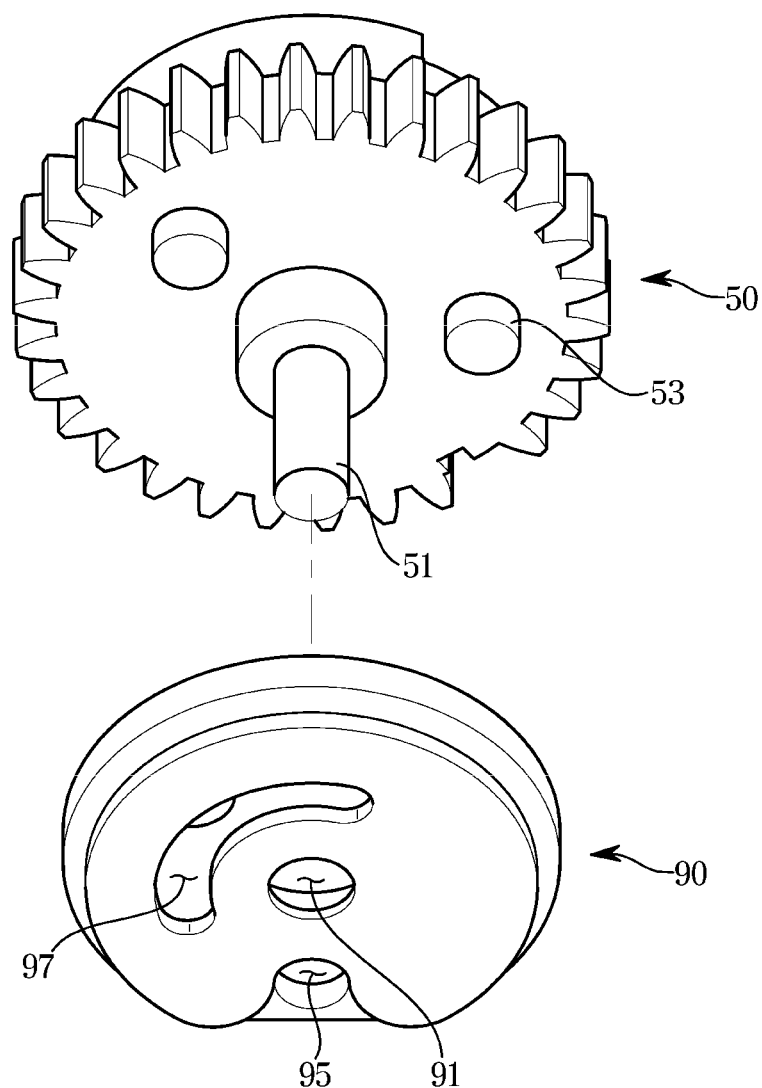
FIG. 3 illustrates a pad gear being coupled to a pad, according to an embodiment of the disclosure.
Figure 4:
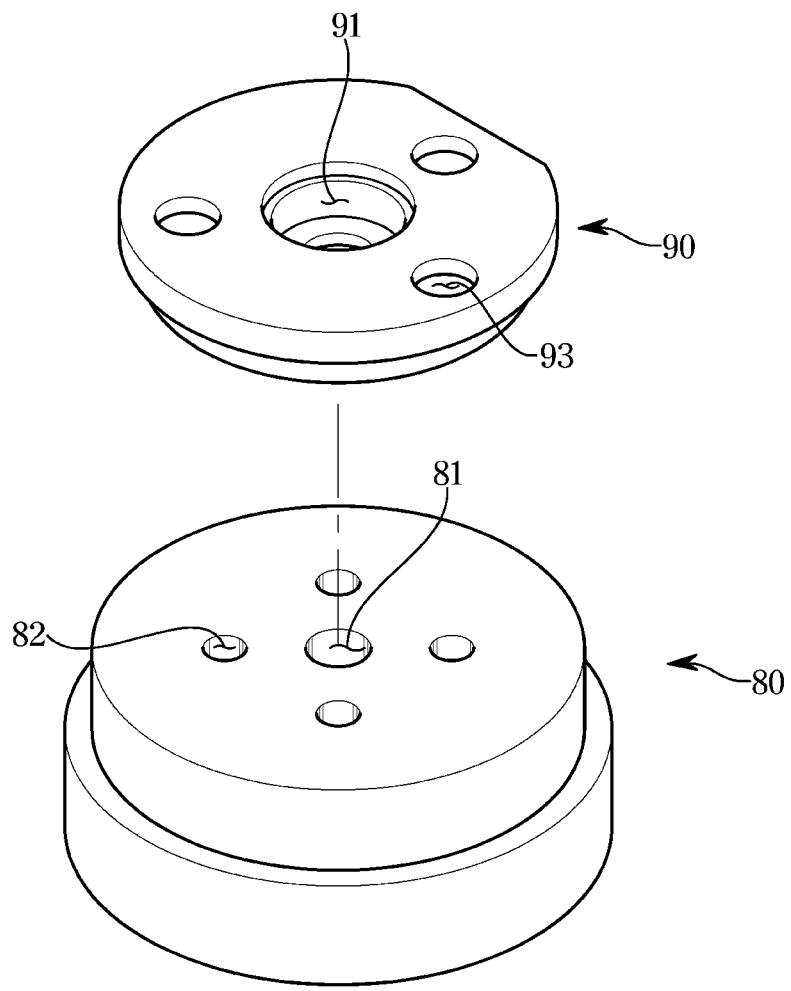
FIG. 4 illustrates a pad being arranged on a boss, according to an embodiment of the disclosure.
Figure 5:
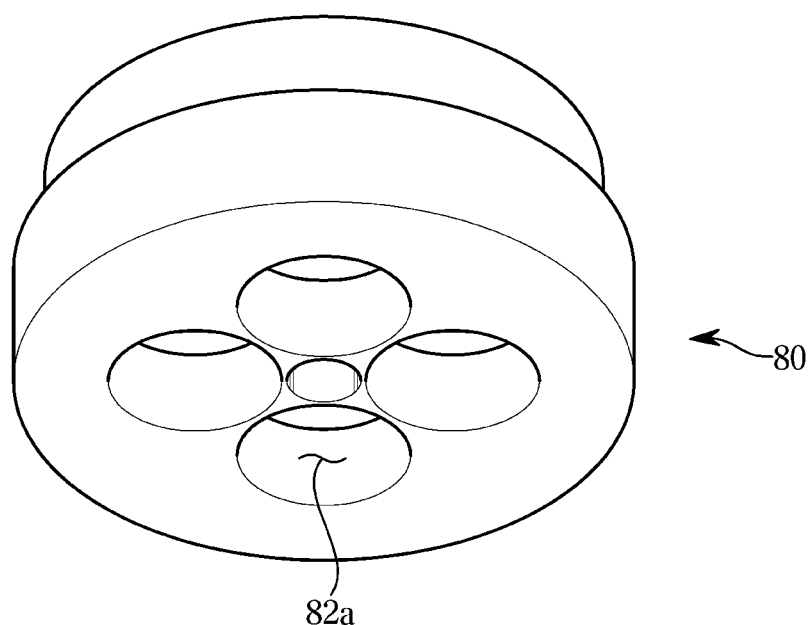
FIG. 5 illustrates a bottom side of a boss, according to an embodiment of the disclosure.
Figure 6:
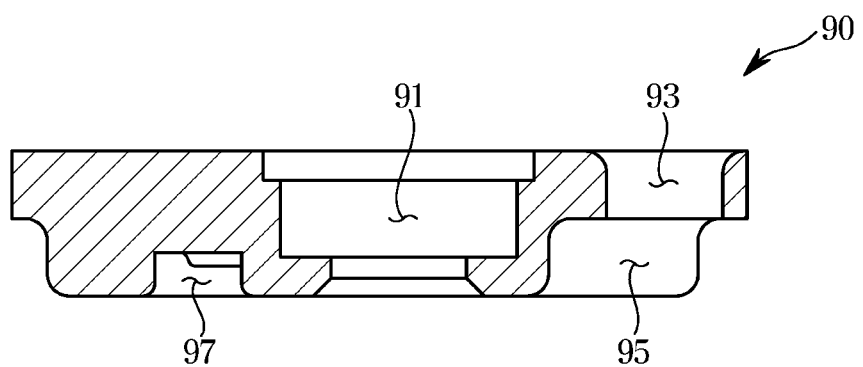
FIG. 6 is a cross-sectional view of a pad, according to an embodiment of the disclosure.
Figure 7:
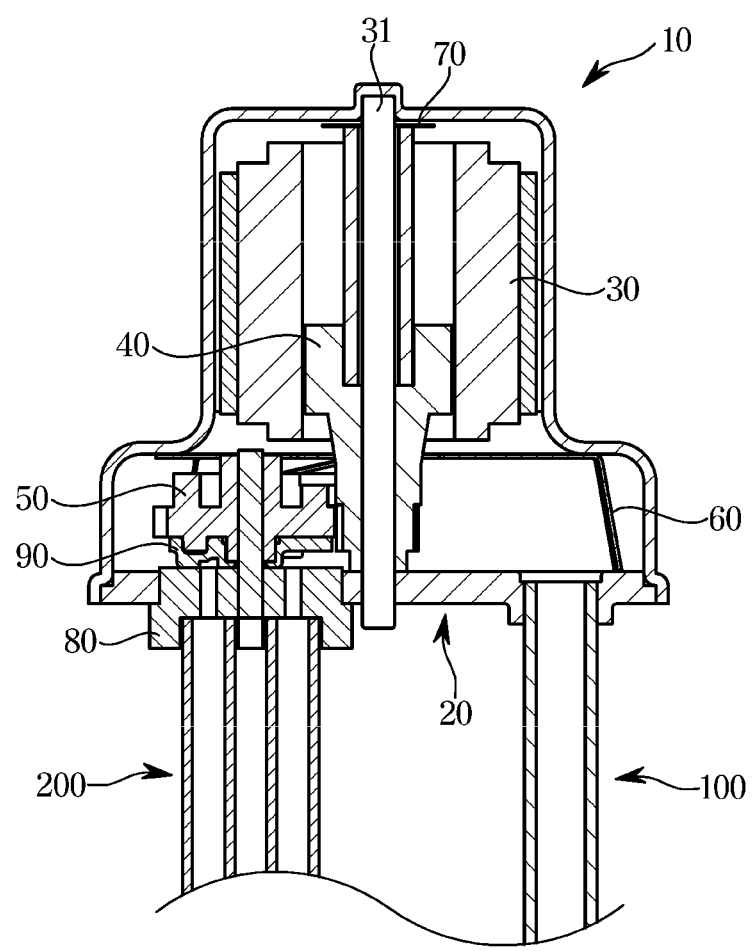
FIG. 7 is a side cross-sectional view of a valve device, according to an embodiment of the disclosure.

FIG. 1 is a perspective view of a valve device, according to an embodiment of the disclosure. FIG. 2 is an exploded perspective view of a valve device, according to an embodiment of the disclosure. FIG. 3 illustrates a pad gear being coupled to a pad, according to an embodiment of the disclosure. FIG. 4 illustrates a pad being arranged on a boss, according to an embodiment of the disclosure. FIG. 5 illustrates a bottom side of a boss, according to an embodiment of the disclosure. FIG. 6 is a cross-sectional view of a pad, according to an embodiment of the disclosure. FIG. 7 is a side cross-sectional view of a valve device, according to an embodiment of the disclosure.

As shown in FIGS. 1 to 7, a valve device may include a case 10, a base plate 20 covering an open bottom of the case 10, a flow-in pipe 100 to which the refrigerant flows in, a plurality of flow-in/out pipes 200 through which the refrigerant flows in/out, a boss 80 including a plurality of refrigerant flow-in/out holes 82 through which the refrigerant flows in/out, and a pad 90 rotationally arranged on the boss 80.

The case 10 may be provided to have the bottom open and a receiving space 11 formed therein.

A rotor 30 may be arranged in the receiving space 11 in the case 10. The rotor 30 may include a rotor shaft 31.

Furthermore, a pinion gear 40 may be arranged in the receiving space 11. The pinion gear 40 may be coupled to the rotor 30. The pinion gear 40 may be coupled to the rotor shaft 31 and rotated along with the rotor 30.

In addition, a pad gear 50 may be arranged in the receiving space 11. The pad gear 50 may be arranged on sides of the pinion gear 40. The pad gear 50 may be in gear with the pinion gear 40 and engaged with the pinion gear 40. Accordingly, when the pinion gear 40 is rotated by the rotor 30, the pad gear 50 may be rotated by the pinion gear 40. The pad gear 50 may include a pad valve shaft 51 corresponding to a rotation axis. The pad valve shaft 51 may be coupled to the pad 90 so that the pad 90 may be rotated along with the pad gear 50. The pad gear 50 may include a pad coupling projection 53 coupled to the pad 90. The pad coupling projection 53 may be provided in the plural. The pad coupling projection 53 may be provided on the bottom surface of the pad gear 50. The pad coupling projection 53 may be coupled to a pad gear coupling hole 93 formed at the top surface of the pad 90.

In addition, an elastic support spring 60 may be arranged in the receiving space 11. The elastic support spring 60 may be fixed to the case 10 in the receiving space 11. The elastic support spring 60 may be in a plate type. The elastic support spring 60 may elastically support a top center of the pad gear 50. The pad gear 50 may be rotationally mounted at the elastic support spring 60.

Furthermore, a rotor support plate spring 70 may be arranged in the receiving space 11. The rotor support plate spring 70 may be fixed to the case 10 in the receiving space 11. The rotor support plate spring 70 may elastically support the rotor 30. The rotor 30 may be rotationally supported on the rotor support late spring 70.

The base plate 20 may cover the open bottom of the case 10. The base plate 20 may include a rotor shaft support hole 21 through which the rotor shaft 31 is rotationally supported. The base plate 20 may include a refrigerant flow-in hole 23 coupled to the flow-in pipe 100 to which the refrigerant flows in. The base plate 20 may include a boss hole 25 through which the boss 80 is installed.

The boss 80 may be installed in the boss hole 25 of the base plate 20. An upper portion of the boss 80 may be arranged in the receiving space 11. A lower portion of the boss 80 may be arranged outside the receiving space 11. The boss 80 may include a pad valve shaft hole 81 to which the pad valve shaft 51 is rotationally inserted. The boss 80 may include a plurality of refrigerant flow-in/out holes 82 through which the refrigerant flows in/out. The plurality of refrigerant flow-in/out holes 82 may be coupled to the plurality of flow-in/out pipes 200 through which the refrigerant flows in/out. There may be four refrigerant flow-in/out holes 82. Also, there may be four flow-in/out pipes 200 coupled to the plurality of refrigerant flow-in/out holes 82. The boss 80 may include a plurality of insertion holes 82a to which the plurality of flow-in/out pipes 200 are inserted. There may be four insertion holes 82a to match the number of the plurality of flow-in/out pipes 200. The plurality of insertion holes 82a may be connected to the plurality of refrigerant flow-in/out holes 82.

The pad 90 may be rotationally arranged on the top of the boss 80. The pad 90 may include a pad valve shaft coupling hole 91 to which the pad valve shaft 51 is coupled. The pad 90 may include a pad gear coupling hole 93 to which the pad coupling projection 53 is coupled. Accordingly, the pad 90 may be rotated along with the pad gear 50. The pad 90 may include an open cavity 95 that selectively opens one of the plurality of refrigerant flow-in/out holes 82 formed at the boss 80. The open cavity 95 may be formed in a lower portion of the pad 90. The open cavity 95 may have the form of a groove sunken upward from the bottom surface of the pad 90. The open cavity 95 may be formed to extend to an edge of the pad 90 in a radial direction. The pad 90 may be rotated along with the pad gear 50 to selectively open one of the plurality of refrigerant flow-in/out holes 82 formed at the boss 80. The pad 90 may include a connection cavity 97 that selectively connects two of the plurality of refrigerant flow-in/out holes 82 formed at the boss 80. The connection cavity 97 may be formed in a lower portion of the pad 90. The connection cavity 97 may have the form of a groove sunken upward from the bottom surface of the pad 90. The connection cavity 97 may connect two adjacent refrigerant flow-in/out holes 82 among the plurality of refrigerant flow-in/out holes 82.

The valve device may further include a stator (not shown). The stator may be provided to enclose a portion, in which the rotor 30 is arranged, from outside of the case 10.

The valve device may further include a bracket (not shown). The bracket may allow the case 10 to be coupled to the stator. The bracket may allow the valve device to be fixed to an external device.

Figure 8:
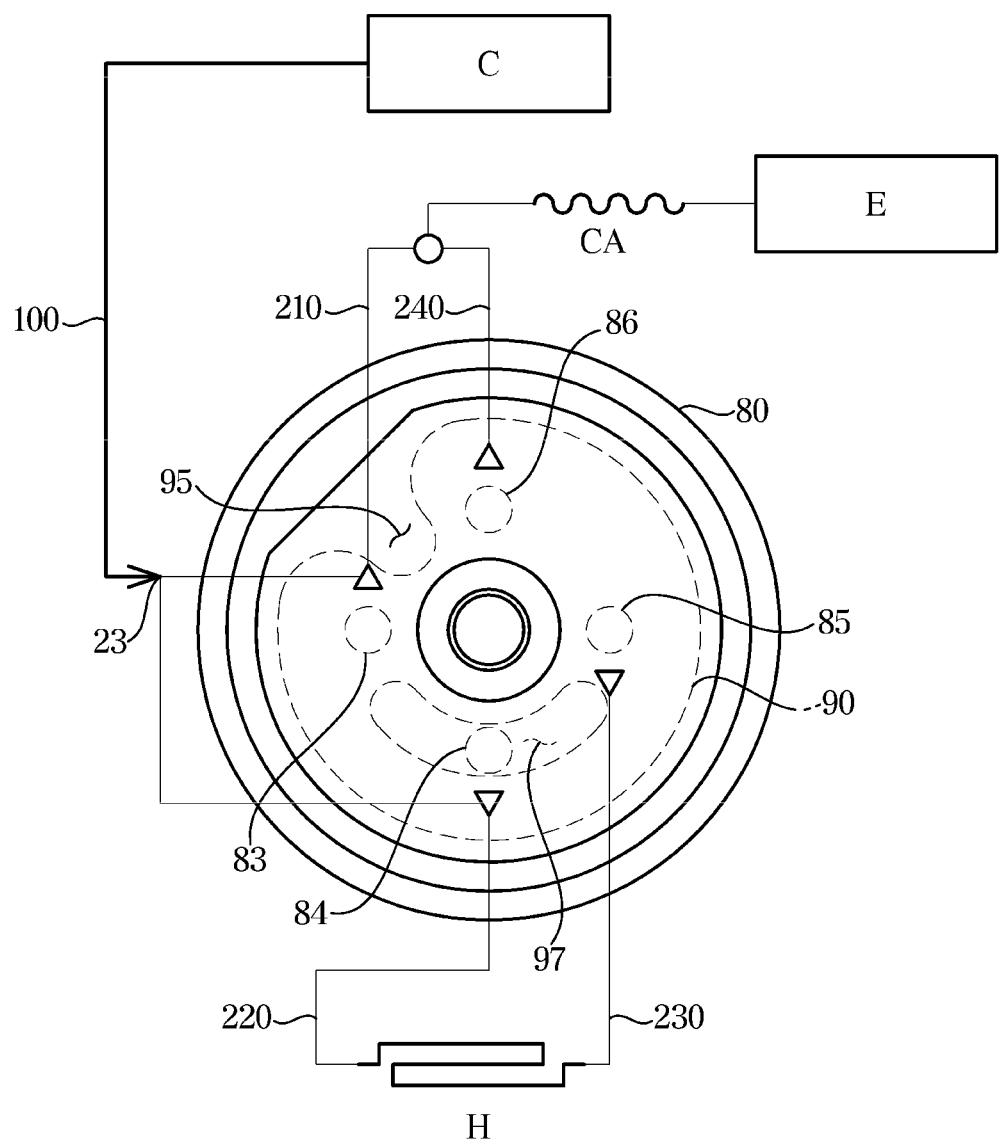
FIG. 8 illustrates a valve-closed state in which all of a plurality of refrigerant flow-in/out holes are blocked by a pad, according to an embodiment of the disclosure.
Figure 9:
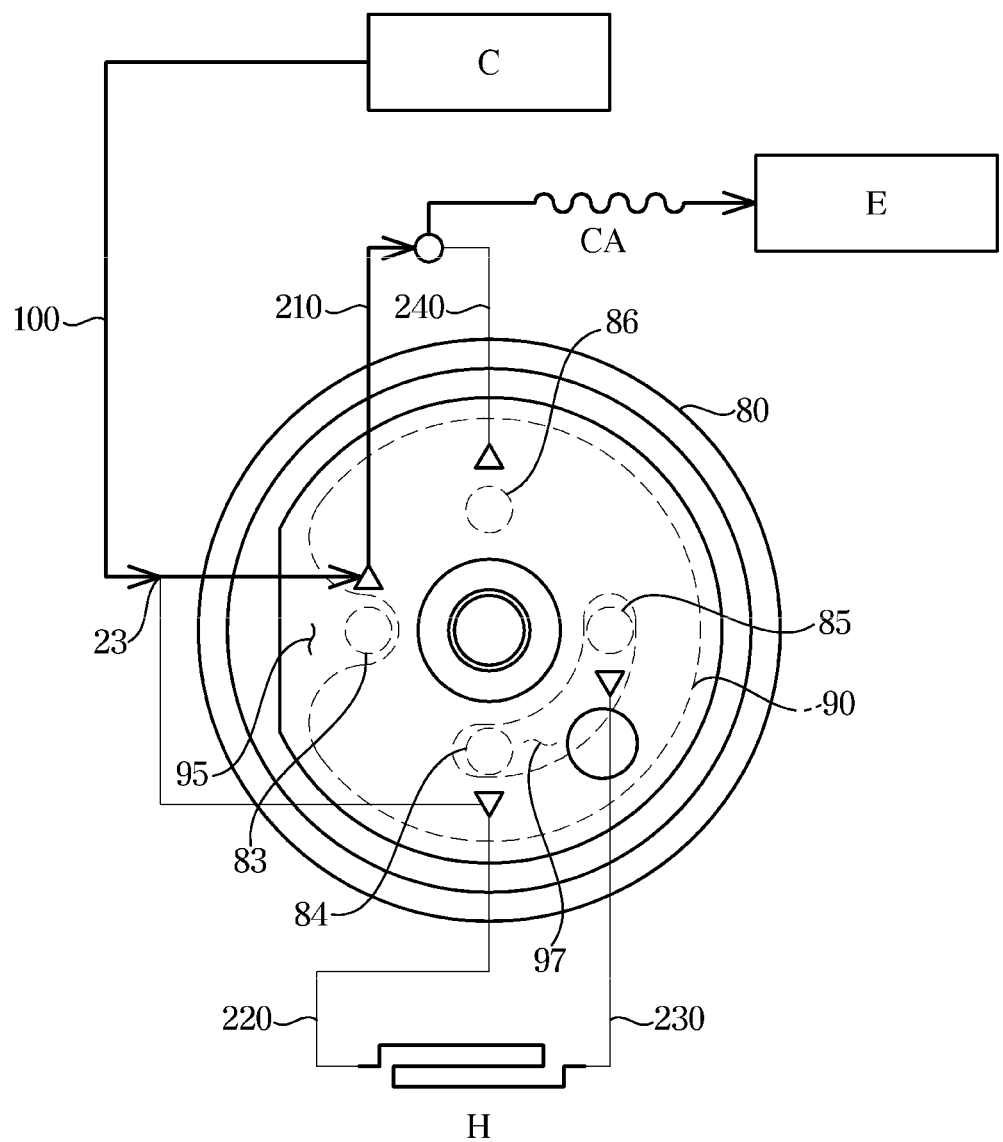
FIG. 9 illustrates a plurality of refrigerant flow-in/out holes with a first refrigerant flow-in/out hole opened by a pad, a fourth refrigerant flow-in/out hole blocked by the pad, and second and third refrigerant flow-in/out holes connected by the pad, according to an embodiment of the disclosure.
Figure 10:
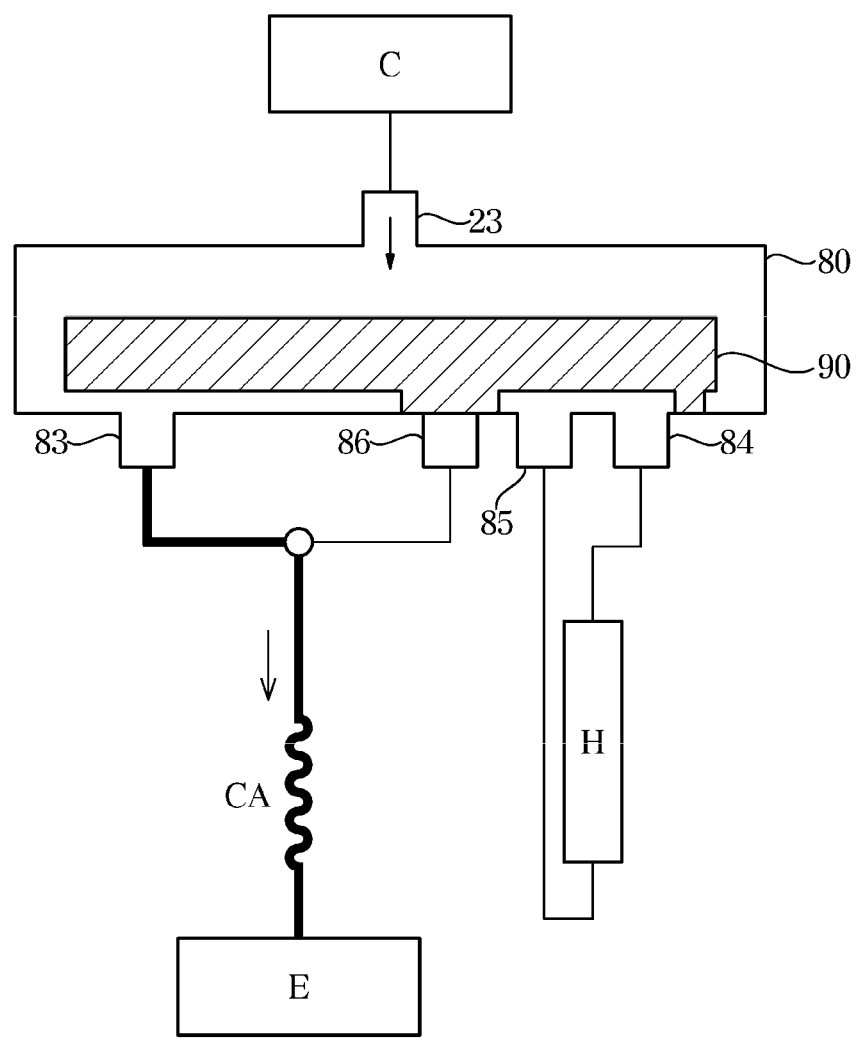
FIG. 10 is a cross-sectional view schematically illustrating a plurality of refrigerant flow-in/out holes with a first refrigerant flow-in/out hole opened by a pad and second and third refrigerant flow-in/out holes connected by the pad, according to an embodiment of the disclosure.
Figure 11:
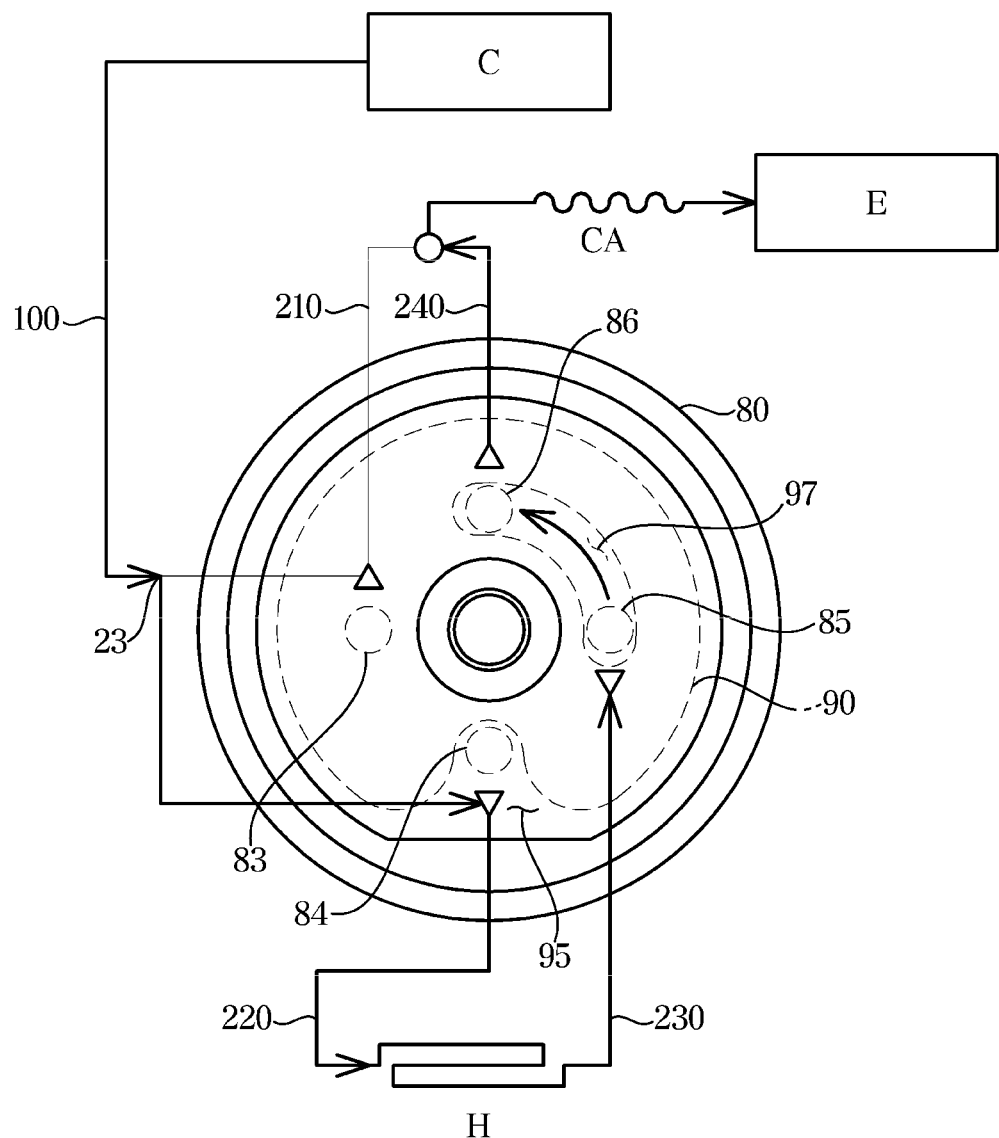
FIG. 11 illustrates a plurality of refrigerant flow-in/out holes with a second refrigerant flow-in/out hole opened by a pad and third and fourth refrigerant flow-in/out holes connected by the pad, according to an embodiment of the disclosure.
Figure 12:
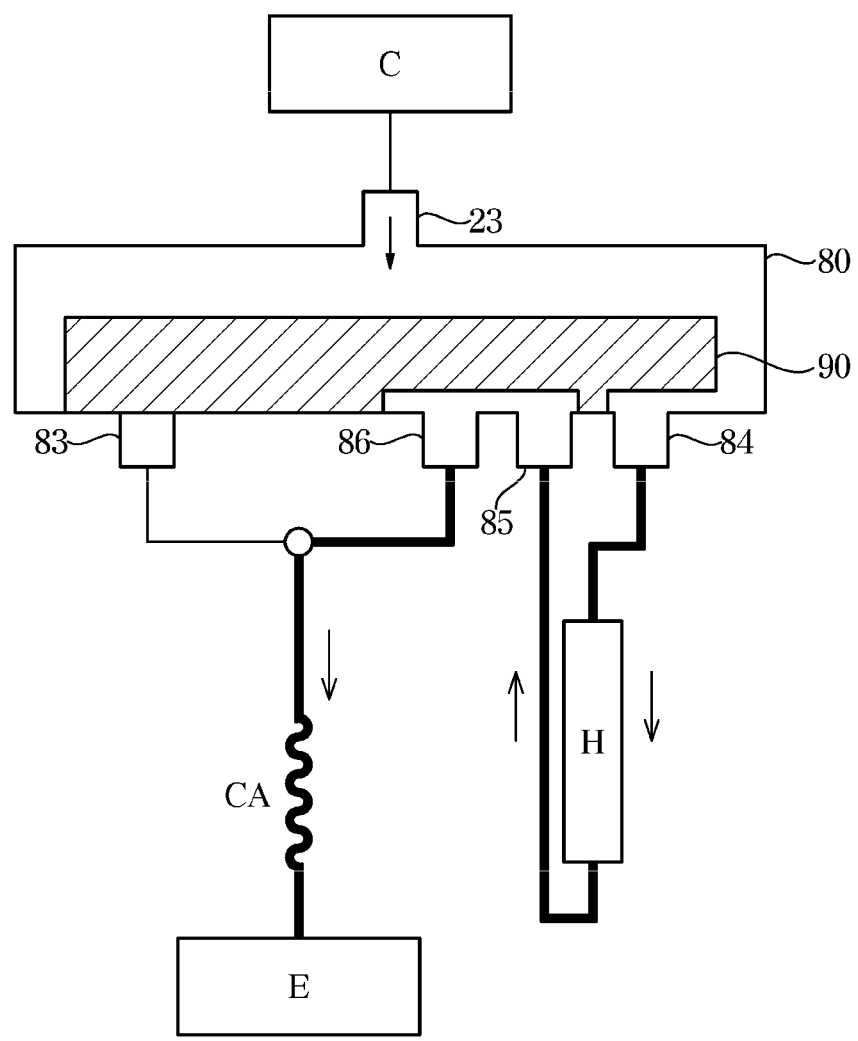
FIG. 12 is a cross-sectional view schematically illustrating a plurality of refrigerant flow-in/out holes with a second refrigerant flow-in/out hole opened by a pad and third and fourth refrigerant flow-in/out holes connected by the pad, according to an embodiment of the disclosure.

FIG. 8 illustrates a valve-closed state in which all of a plurality of refrigerant flow-in/out holes are blocked by a pad, according to an embodiment of the disclosure. FIG. 9 illustrates a plurality of refrigerant flow-in/out holes with a first refrigerant flow-in/out hole opened by a pad, a fourth refrigerant flow-in/out hole blocked by the pad, and second and third refrigerant flow-in/out holes connected by the pad, according to an embodiment of the disclosure. FIG. 10 is a cross-sectional view schematically illustrating a plurality of refrigerant flow-in/out holes with a first refrigerant flow-in/out hole opened by a pad and second and third refrigerant flow-in/out holes connected by the pad, according to an embodiment of the disclosure. FIG. 11 illustrates a plurality of refrigerant flow-in/out holes with a second refrigerant flow-in/out hole opened by a pad and third and fourth refrigerant flow-in/out holes connected by the pad, according to an embodiment of the disclosure. FIG. 12 is a cross-sectional view schematically illustrating a plurality of refrigerant flow-in/out holes with a second refrigerant flow-in/out hole opened by a pad and third and fourth refrigerant flow-in/out holes connected by the pad, according to an embodiment of the disclosure.

As shown in FIG. 8, the refrigerant compressed in a compressor (not shown) may be sent to a condenser C to be condensed. The refrigerant condensed in the condenser C may be sent to a capillary tube CA, which is an expansion device, to be expanded. The refrigerant expanded in the capillary tube CA may be sent to an evaporator E, and may produce cold air through heat exchange in the evaporator E.

For example, in a case of a refrigerator, the refrigerant condensed in the condenser C may be sent to the capillary tube CA directly or through a hot pipe H.

The hot pipe H may be a pipe installed to prevent dew formation caused in a gasket portion of a refrigerator door, which is a portion vulnerable to the temperature in the refrigerator. Specifically, a high-temperature refrigerant of a high-pressure part of a refrigeration cycle may pass the hot pipe H to prevent dew formation in the gasket portion of the refrigeration door.

The hot pipe H only needs to maintain a temperature above the dew point based on humidity in the outside air, but maintaining the temperature above the dew point in the refrigerator acts as a thermal load in the refrigerator, leading to an increase in power consumption of the refrigerator, so the refrigerant condensed in the condenser C may be sent to the capillary tube CA through the hop pipe H or directly without going through the hot pipe H depending on the operation condition. For this, the valve device may be installed at an outlet pipe through which the refrigerant condensed in the condenser C flows out.

The flow-in pipe 100 may be connected to the outlet pipe of the condenser C. The flow-in pipe 100 may be connected to the receiving space 11 in the case 10 through the refrigerant flow-in hole 23 (see FIG. 2).

The plurality of refrigerant flow-in/out holes 82 may include a first refrigerant flow-in/out hole 83, and a second refrigerant flow-in/out hole 84, a third refrigerant flow-in/out hole 85, and a fourth refrigerant flow-in/out hole 86 formed in positions sequentially rotated 90 degrees counterclockwise starting from the first refrigerant flow-in/out hole 83 based on the center of the boss 80.

The plurality of flow-in/out pipes 200 may include a first flow-in/out pipe 210 coupled to the first refrigerant flow-in/out hole 83, a second flow-in/out pipe 220 coupled to the second refrigerant flow-in/out hole 84, a third flow-in/out pipe 310 coupled to the third refrigerant flow-in/out hole 85, and a fourth flow-in/out pipe 240 coupled to the fourth refrigerant flow-in/out hole 86, The second flow-in/out pipe 220 may be connected to one end of the hot pipe H. The third flow-in/out pipe 230 may be connected to an other end of the hot pipe H. The first flow-in/out pipe 210 and the fourth flow-in/out pipe 240 may be coupled to the capillary tube CA. One end of the hot pipe may be an entrance where the refrigerant from the receiving space flows into and the other end of the hot pipe may be an exit where the refrigerant in the hot pipe flows out.

When the open cavity 95 of the pad 90 is positioned in the middle of the first and fourth refrigerant flow-in/out holes 83 and 86, the plurality of refrigerant flow-in/out holes 83, 84, 85, and 86 may all be blocked by the pad 90, which may correspond to a valve-closed state. In the valve-closed state, the refrigerant may not flow.

As shown in FIGS. 9 and 10, the refrigerant condensed in the condenser C may be sent to the capillary tube CA directly without going through the hot pipe H.

When the pad 90 is rotated 45 degrees counterclockwise around the center of the boss 80 from the position in the valve-closed state, the open cavity 95 may open the first refrigerant flow-in/out hole 83. The fourth refrigerant flow-in/out hole 86 may be blocked by the pad 90. The second and third refrigerant flow-in/out holes 84 and 85 may be connected by the connection cavity 97.

The refrigerant that has flown into the flow-in pipe 100 from the condenser C may flow into the receiving space 11 (see FIG. 2) through the refrigerant flow-in hole 23. The refrigerant that has flown in may flow out to the first flow-in/out pipe 210 through the first refrigerant flow-in/out hole 83 opened by the open cavity 95 and then flow into the capillary tube CA. The refrigerant that has flown into the capillary tube CA may be expanded and may flow into the evaporator E.

In this case, As the fourth refrigerant flow-in/out hole 86 is blocked by the pad 90, the refrigerant flowing into the capillary tube CA through the first flow-in/out pipe 210 may be prevented from flowing backward to the fourth flow-in/out pipe 240.

As shown in FIGS. 11 and 12, the refrigerant condensed in the condenser C may be sent to the capillary tube CA through the hot pipe H.

When the pad 90 is rotated 135 degrees counterclockwise around the center of the boss 80 from the position in the valve-closed state, the open cavity 95 may open the second refrigerant flow-in/out hole 84. The first refrigerant flow-in/ out hole 83 may be blocked by the pad 90. The third and fourth refrigerant flow-in/out holes 85 and 86 may be connected by the connection cavity 97.

The refrigerant that has flown into the flow-in pipe 100 from the condenser C may flow into the receiving space 11 (see FIG. 2) through the refrigerant flow-in hole 23. The refrigerant that has flown in may flow out to the second flow-in/out pipe 220 through the second refrigerant flow-in/out hole 84 opened by the open cavity 95 of the pad 90. The refrigerant that has flown out to the second flow-in/out pipe 220 may flow into the third flow-in/out pipe 230 through the hot pipe H. The refrigerant that has flown into the third flow-in/out pipe 230 may flow out to the fourth flow-in/out pipe 240 through the fourth refrigerant flow-in/out hole 86 connected to the third refrigerant flow-in/out hole 85 by the connection cavity 97. The refrigerant that has flown out to the fourth flow-in/out pipe 240 may flow into the capillary tube CA. The refrigerant that has flown into the capillary tube CA may be expanded and may flow into the evaporator E.

Figure 13:
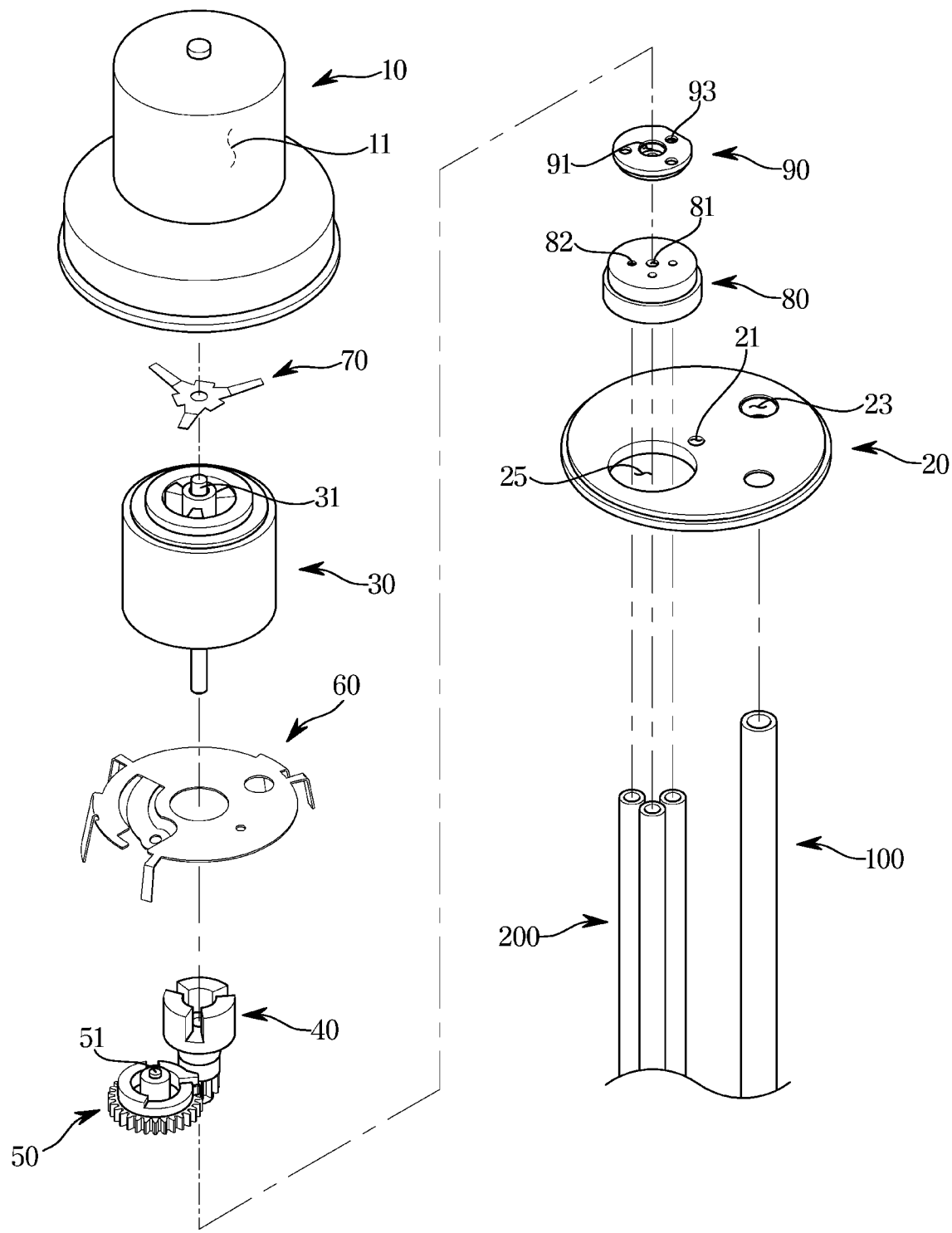
FIG. 13 is an exploded perspective view of a valve device, according to another embodiment of the disclosure.
Figure 14:
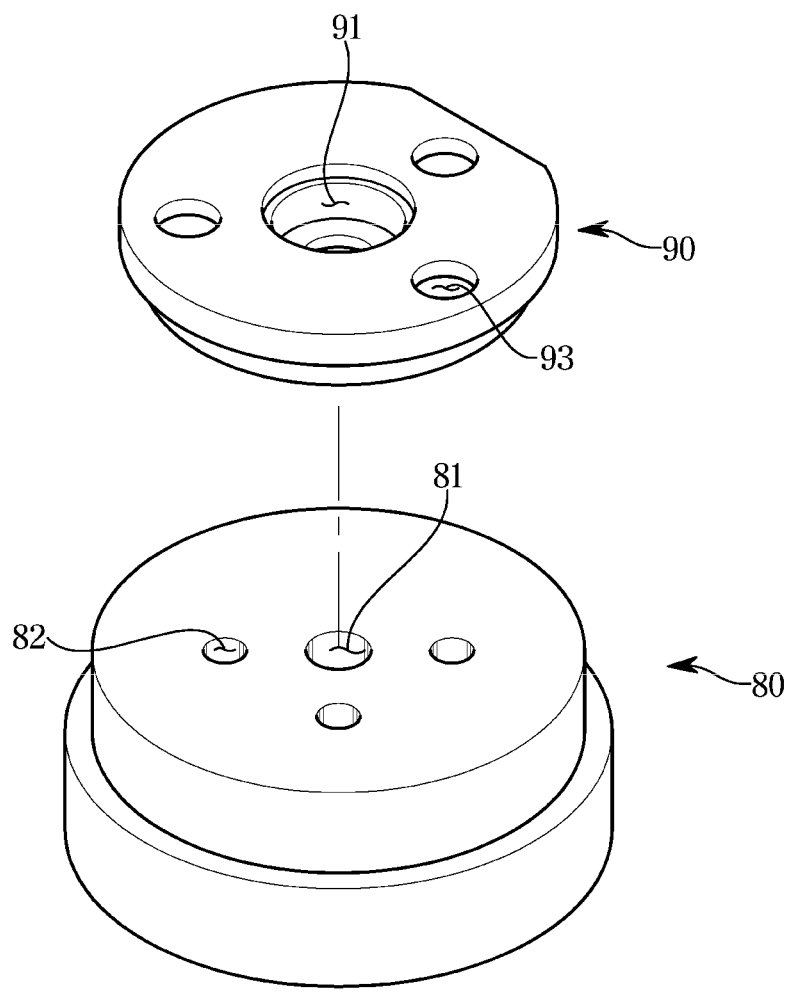
FIG. 14 illustrates a pad being arranged on a boss, according to another embodiment of the disclosure.
Figure 15:
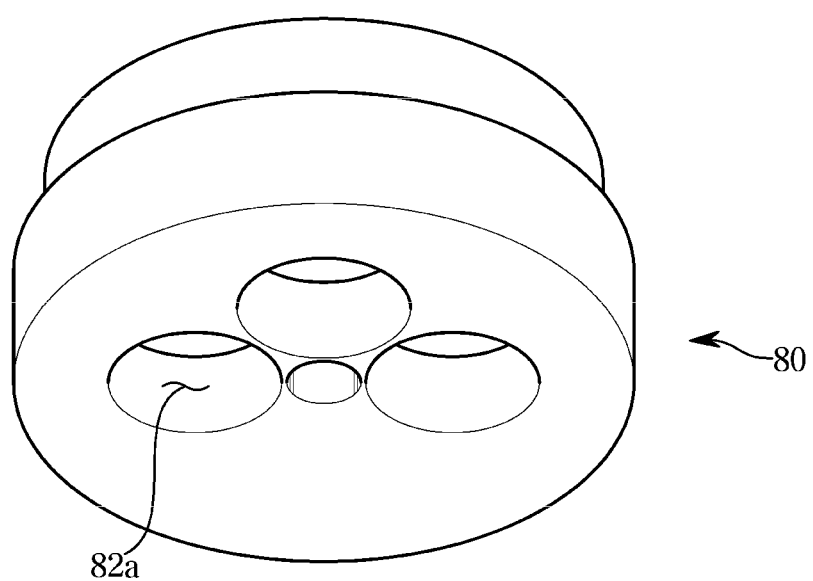
FIG. 15 illustrates a bottom side of a boss, according to another embodiment of the disclosure.

FIG. 13 is an exploded perspective view of a valve device, according to another embodiment of the disclosure. FIG. 14 illustrates a pad being arranged on a boss, according to another embodiment of the disclosure. FIG. 15 illustrates a bottom side of a boss, according to another embodiment of the disclosure.

As shown in FIGS. 13 to 15, a valve device may include a case 10, a base plate 20 covering an open bottom of the case 10, a flow-in pipe 100 to which the refrigerant flows in, a plurality of flow-in/out pipes 200 through which the refrigerant flows in/out, a boss 80 including a plurality of refrigerant flow-in/out holes 82 through which the refrigerant flows in/out, and a pad 90 rotationally arranged on the boss 80.

Compared to the valve device shown in FIGS. 1 to 7, different elements will be described only.

The boss 80 may be installed in the boss hole 25 of the base plate 20. An upper portion of the boss 80 may be arranged in the receiving space 11. A lower portion of the boss 80 may be arranged outside the receiving space 11. The boss 80 may include the pad valve shaft hole 81 to which the pad valve shaft 51 is rotationally inserted. The boss 80 may include the plurality of refrigerant flow-in/out holes 82 through which the refrigerant flows in/out. The plurality of refrigerant flow-in/out holes 82 may be coupled to the plurality of flow-in/out pipes 200 through which the refrigerant flows in/out. There may be three refrigerant flow-in/out holes 82. Also, there may be three flow-in/out pipes 200 coupled to the plurality of refrigerant flow-in/out holes 82. The boss 80 may include a plurality of insertion holes 82*a* to which the plurality of flow-in/out pipes 200 are inserted. There may be three insertion holes 82*a* to match the number of the plurality of flow-in/out pipes 200. The plurality of insertion holes 82*a* may be connected to the plurality of refrigerant flow-in/out holes 82.

Except the structure in which three flow-in/out pipes 200 are arranged and thus, there are three refrigerant flow-in/out holes 82 and three insertion holes 82*a*, all the other structures may be the same as in the valve device shown in FIGS. 1 to 7.

Figure 16:
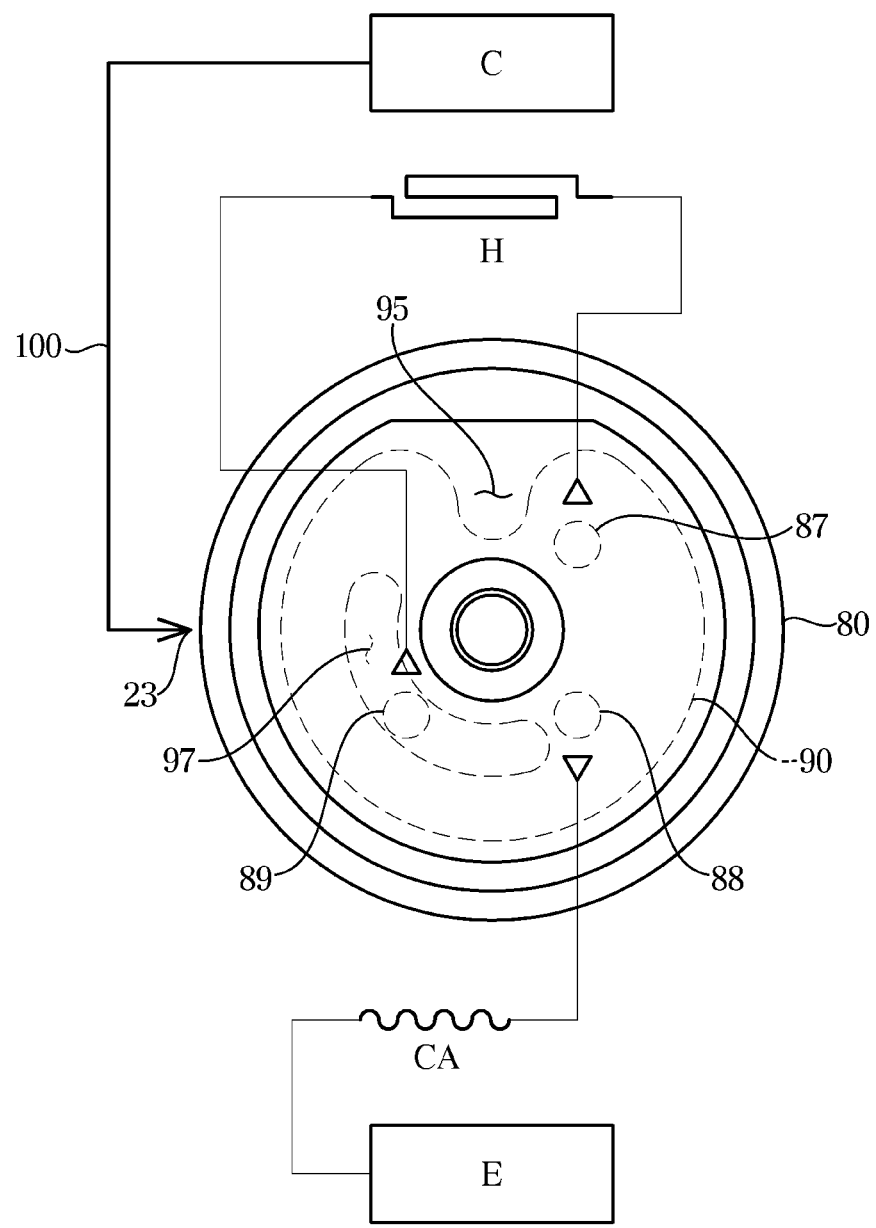
FIG. 16 illustrates a valve-closed state in which a plurality of refrigerant flow-in/out holes are all blocked by a pad, according to another embodiment of the disclosure.
Figure 17:
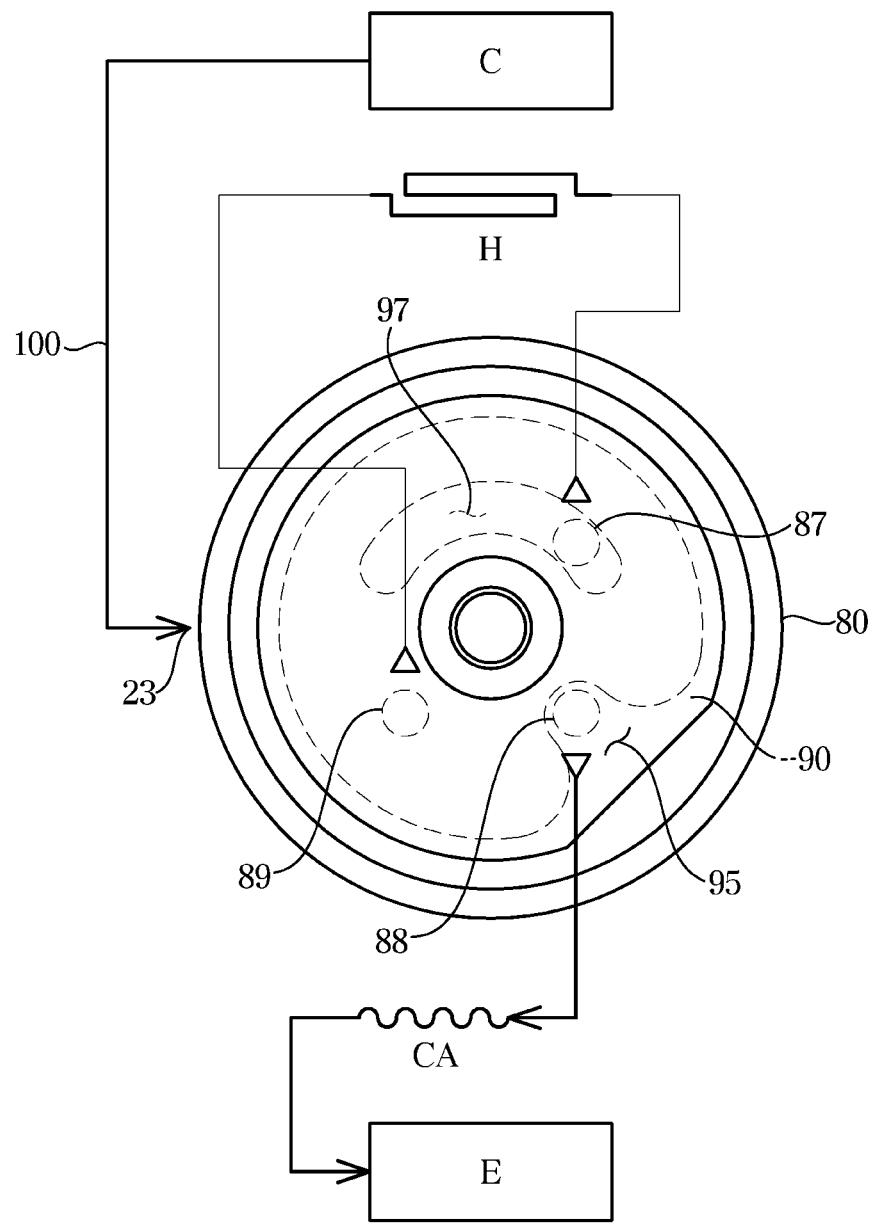
FIG. 17 illustrates a plurality of refrigerant flow-in/out holes with a second refrigerant flow-in/out hole opened by a pad, a third refrigerant flow-in/out hole blocked by the pad, and the second refrigerant flow-in/out hole blocked by a connection cavity, according to another embodiment of the disclosure.
Figure 18:
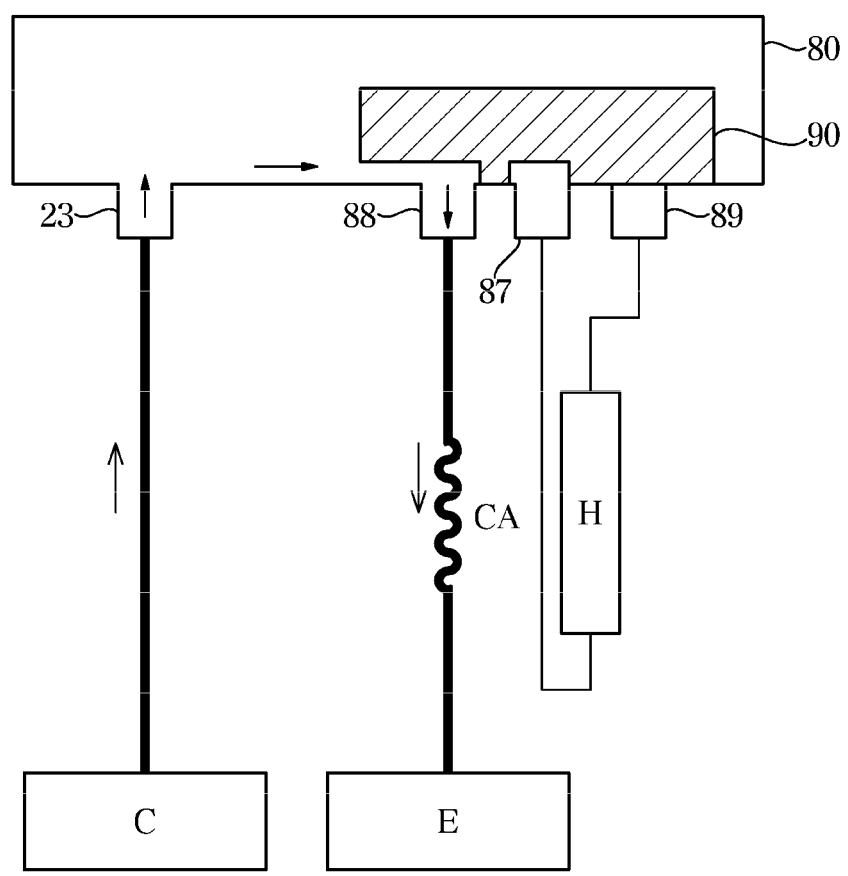
FIG. 18 is a cross-sectional view schematically illustrating a plurality of refrigerant flow-in/out holes with a second refrigerant flow-in/out hole opened by a pad, a third refrigerant flow-in/out hole blocked by the pad, and the second refrigerant flow-in/out hole blocked by a connection cavity, according to another embodiment of the disclosure.
Figure 19:
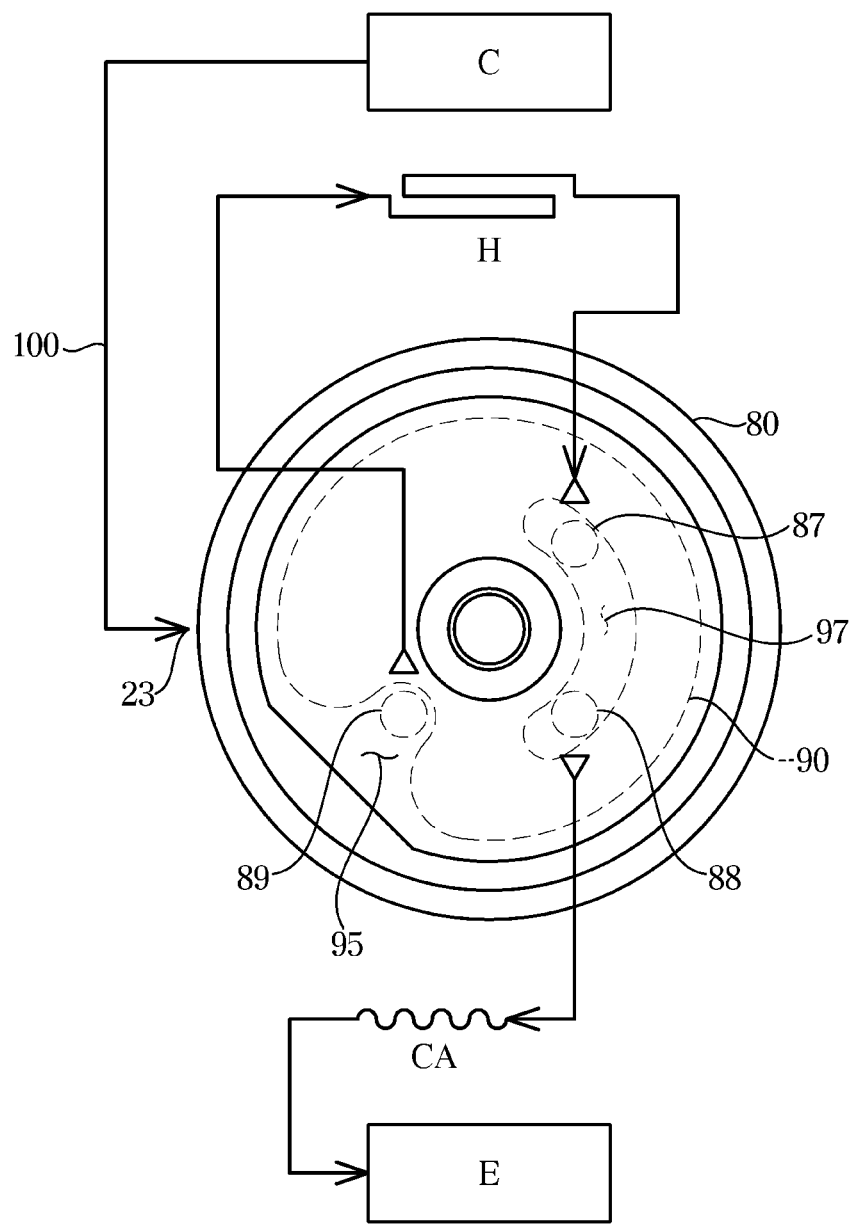
FIG. 19 illustrates a plurality of refrigerant flow-in/out holes with a third refrigerant flow-in/out hole opened by a pad and first and second refrigerant flow-in/out holes connected by the pad, according to another embodiment of the disclosure.

FIG. 16 illustrates a valve-closed state in which a plurality of refrigerant flow-in/out holes are all blocked by a pad, according to another embodiment of the disclosure. FIG. 17 illustrates a plurality of refrigerant flow-in/out holes with a second refrigerant flow-in/out hole opened by a pad, a third refrigerant flow-in/out hole blocked by the pad, and the second refrigerant flow-in/out hole blocked by a connection cavity, according to another embodiment of the disclosure. FIG. 18 is a cross-sectional view schematically illustrating a plurality of refrigerant flow-in/out holes with a second refrigerant flow-in/out hole opened by a pad, a third refrigerant flow-in/out hole blocked by the pad, and the second refrigerant flow-in/out hole blocked by a connection cavity, according to another embodiment of the disclosure. FIG. 19 illustrates a plurality of refrigerant flow-in/out holes with a third refrigerant flow-in/out hole opened by a pad and first and second refrigerant flow-in/out holes connected by the pad, according to another embodiment of the disclosure. FIG. 20 is a cross-sectional view schematically illustrating a plurality of refrigerant flow-in/out holes with a third refrigerant flow-in/out hole opened by a pad and first and second refrigerant flow-in/out holes connected by the pad, according to another embodiment of the disclosure.

As shown in FIG. 16, the refrigerant compressed in a compressor (not shown) may be sent to a condenser C to be condensed. The refrigerant condensed in the condenser C may be sent to a capillary tube CA, which is an expansion device, to be expanded. The refrigerant expanded in the capillary tube CA may be sent to the evaporator E, and may produce cold air through heat exchange in the evaporator E.

For example, in a case of a refrigerator, the refrigerant condensed in the condenser C may be sent to the capillary tube CA directly or through the hot pipe H.

The hot pipe H may be a pipe installed to prevent dew formation caused in a gasket portion of a refrigerator door, which is a portion vulnerable to the temperature in the refrigerator. Specifically, a high-temperature refrigerant of a high-pressure part of a refrigeration cycle may pass the hot pipe H to prevent dew formation in the gasket portion of the refrigeration door.

The hot pipe H only needs to maintain a temperature above the dew point based on humidity in the outside air, but maintaining the temperature above the dew point in the refrigerator acts as a thermal load in the refrigerator, leading to an increase in power consumption of the refrigerator, so the refrigerant condensed in the condenser C may be sent to the capillary tube CA through the hop pipe H or directly without going through the hot pipe H depending on the operation condition. For this, the valve device may be installed at an outlet pipe through which the refrigerant condensed in the condenser C flows out.

The flow-in pipe 100 may be connected to the outlet pipe of the condenser C. The flow-in pipe 100 may be connected to the receiving space 11 in the case 10 through the refrigerant flow-in hole 23 (see FIG. 13).

The plurality of refrigerant flow-in/out holes 82 may include a first refrigerant flow-in/out hole 87, and a second refrigerant flow-in/out hole 88 and a third refrigerant flow-in/out hole 89 formed in positions sequentially rotated 90 degrees counterclockwise starting from the first refrigerant flow-in/out hole 87 based on the center of the boss 80.

The plurality of flow-in/out pipes 200 may include a first flow-in/out pipe 210 coupled to the first refrigerant flow-in/out hole 87, a second flow-in/out pipe 220 coupled to the second refrigerant flow-in/out hole 88, and a third flow-in/out pipe 230 coupled to the third refrigerant flow-in/out hole 89.

The first flow-in/out pipe 210 may be connected to an exit of the hot pipe H. The third flow-in/out pipe 230 may be connected to an entrance of the hot pipe H. The second flow-in/out pipe 220 may be connected to the capillary tube CA.

When the open cavity 95 of the pad 90 is in a position rotated 45 degrees counterclockwise from the first refrigerant flow-in/out hole 87 based on the center of the boss 80, the plurality of refrigerant flow-in/out holes 87, 88, and 89 may all be blocked by the pad 90, which may correspond to the valve-closed state. In the valve-closed state, the refrigerant may not flow.

As shown in FIGS. 17 and 18, the refrigerant condensed in the condenser C may be sent to the capillary tube CA directly without going through the hot pipe H.

When the pad 90 is rotated 135 degrees clockwise around the center of the boss 80 from the position in the valve-closed state, the second refrigerant flow-in/out hole 88 may be opened by the open cavity 95. The third refrigerant flow-in/out hole 89 may be blocked by the bottom side of the pad 90. The second refrigerant flow-in/out hole 88 may be blocked by the connection cavity 97.

The refrigerant that has flown into the flow-in pipe 100 from the condenser C may flow into the receiving space 11 (see FIG. 13) through the refrigerant flow-in hole 23. The refrigerant that has flown in may flow out to the second flow-in/out pipe 220 through the second refrigerant flow-in/out hole 88 opened by the open cavity 95. The refrigerant that has flown out to the second flow-in/out pipe 220 may flow into the capillary tube CA to be expanded. The refrigerant that has flown into and expanded in the capillary tube CA may flow into the evaporator E.

In this case, as the first and third refrigerant flow-in/out holes 87 and 89 are blocked, the refrigerant flowing into the capillary tube CA through the second flow-in/out pipe 220 may be prevented from flowing backward.

As shown in FIGS. 19 and 20, the refrigerant condensed in the condenser C may be sent to the capillary tube CA through the hot pipe H.

When the pad 90 is rotated 225 degrees clockwise around the center of the boss 80 from the position in the valve-closed state, the open cavity 95 may open the third refrigerant flow-in/out hole 89. The first and second refrigerant flow-in/out holes 87 and 88 may be connected by the connection cavity 97.

The refrigerant that has flown into the flow-in pipe 100 from the condenser C may flow into the receiving space 11 (see FIG. 13) through the refrigerant flow-in hole 23. The refrigerant that has flown in may flow out to the third flow-in/out pipe 230 through the third refrigerant flow-in/out hole 89 opened by the open cavity 95. The refrigerant that has flown out to the third flow-in/out pipe 230 may flow into the first flow-in/out pipe 210 through the hot pipe H. The refrigerant that has flown into the first flow-in/out pipe 210 may flow out to the second flow-in/out pipe 220 through the second refrigerant flow-in/out hole 88 connected to the first refrigerant flow-in/out hole 87 by the connection cavity 97. The refrigerant that has flown out to the second flow-in/out pipe 269220 may flow into the capillary tube CA. The refrigerant that has flown into the capillary tube CA may be expanded and may flow into the evaporator E.

Particular shapes and directions are focused above in describing the valve device with reference to the accompanying drawings, but a person of ordinary skill in the art will understand and appreciate that various modifications and alterations can be made without departing from the scope of the disclosure. Thus, it will be apparent to those of ordinary skill in the art that the disclosure is not limited to the embodiments described, which have been provided only for illustrative purposes.

What is claimed is:

1. A valve device comprising:
   a case having an open bottom portion and a receiving space formed therein;
   a rotor arranged in the receiving space and including a rotor shaft;
   a pinion gear rotatably coupled to the rotor shaft and to be rotated along with the rotor;
   a pad gear arranged on a side of the pinion gear to be engaged with the pinion gear, and to be rotated by the pinion gear, the pad gear including a pad valve shaft, which is a rotation shaft of the pad gear;
   a base plate to cover the open bottom portion of the case;
   a flow-in pipe coupled to the base plate to introduce a-refrigerant to the receiving space therethrough;
   a boss installed to the base plate, and including a plurality of refrigerant flow-in/out holes through which the introduced refrigerant flows in/out;
   a plurality of flow-in/out pipes coupled to the plurality of refrigerant flow-in/out holes and through which the introduced refrigerant flows in/out; and
   a pad arranged on the boss and rotatably coupled to the pad valve shaft so that the pad is rotatable with respect to the boss, the pad including:
   an open cavity formed therein to selectively open one of the plurality of refrigerant flow-in/out holes, and
   a connection cavity formed therein to selectively connect to one or two of the plurality of refrigerant flow-in/out holes,
   wherein the connection cavity is a closed cavity which is not directly opened to the receiving space, and
   the open cavity and the connection cavity are formed on a bottom surface of the pad facing the boss.

2. The valve device of claim 1, wherein the boss comprises a plurality of insertion holes to which the plurality of flow-in/out pipes are inserted, and the plurality of insertion holes are formed to be connected to the plurality of refrigerant flow-in/out holes.

3. The valve device of claim 1, wherein the open cavity and the connection cavity are each formed to have a shape of a groove recessed from the bottom surface of the pad facing the boss.

4. The valve device of claim 3, wherein the open cavity is formed to extend to an edge of the pad in a radial direction of the pad.

5. The valve device of claim 3, wherein the connection cavity is configured to connect two adjacent refrigerant flow-in/out holes together among the plurality of refrigerant flow-in/out holes.

6. The valve device of claim 1, wherein the plurality of refrigerant flow-in/out holes comprise:
   a first refrigerant flow-in/out hole;
   a second refrigerant flow-in/out holed;
   a third refrigerant flow-in/out hole; and
   a fourth refrigerant flow-in/out hole; and
   wherein the plurality of refrigerant flow-in/out holes are formed in positions sequentially rotated 90 degrees counterclockwise starting from the first refrigerant flow-in/out hole to the fourth refrigerant flow-in/out hole based on a center of the boss.

7. The valve device of claim 6, wherein the plurality of flow-in/out pipes comprise:
   a first flow-in/out pipe coupled to the first refrigerant flow-in/out hole;
   a second flow-in/out pipe coupled to the second refrigerant flow-in/out hole;
   a third flow-in/out pipe coupled to the third refrigerant flow-in/out hole; and
   a fourth flow-in/out pipe coupled to the fourth refrigerant flow-in/out hole.

8. The valve device of claim 7, wherein the flow-in pipe is connected to an outlet pipe of a condenser to receive a-refrigerant from the condenser therethrough, the second flow-in/out pipe is connected to one end of a hot pipe, the third flow-in/out pipe is connected to an other end of the hot pipe, and the first flow-in/out pipe and the fourth flow-in/out pipe are connected to a capillary tube.

9. The valve device of claim 8, wherein in a valve-closed state, the open cavity is located in between the first refrigerant flow-in/out hole and the fourth refrigerant flow-in/out hole so that all of the plurality of refrigerant flow-in/out holes are closed.

10. The valve device of claim 9, wherein in response to the pad being rotated 45 degrees counterclockwise around the center of the boss from a position in the valve-closed state, the first refrigerant flow-in/out hole is opened by the open cavity, the fourth refrigerant flow-in/out hole is closed, and the second refrigerant flow-in/out hole and the third refrigerant flow-in/out hole are connected by the connection cavity.

11. The valve device of claim 10, wherein the refrigerant flowing into the receiving space through the flow-in pipe flows out into the first flow-in/out pipe through the first refrigerant flow-in/out hole and flows into the capillary tube, and the fourth refrigerant flow-in/out hole is closed, thereby closing an outflow into the fourth flow-in/out pipe.

12. The valve device of claim 9, wherein in response to the pad being rotated 135 degrees counterclockwise around the center of the boss from the position in the valve-closed state, the second refrigerant flow-in/out hole is opened by the open cavity, the first refrigerant flow-in/out hole is closed, and the third refrigerant flow-in/out hole and the fourth refrigerant flow-in/out hole are connected by the connection cavity.

13. The valve device of claim 12, wherein the refrigerant flowing into the receiving space through the flow-in pipe flows out into the second flow-in/out pipe through the second refrigerant flow-in/out hole and flows into the third flow-in/out pipe through the hot pipe, and the refrigerant flowing into the third flow-in/out pipe flows out into the fourth flow-in/out pipe through the fourth refrigerant flow-in/out hole connected to the third refrigerant flow-in/out hole by the connection cavity and flows into the capillary tube.

14. The valve device of claim 8, the one end of the hot pipe is an entrance where the refrigerant from the receiving space flows into and the other end of the hot pipe is an exit where the refrigerant in the hot pipe flows out.

15. A valve device comprising:

a case having a receiving space formed therein, a flow-in hole, and a boss hole;

a rotor installed in the receiving space and including a rotor shaft;

a pinion gear rotatably coupled to the rotor shaft and to be rotated by the rotor;

a pad gear engaged with the pinion gear to be rotated with the pinion gear, the pad gear including a pad valve shaft;

a flow-in pipe coupled to the flow-in hole to introduce a-refrigerant to the receiving space therethrough;

a boss installed to the boss hole and including a plurality of flow-in/out holes;

a plurality of flow-in/out pipes respectively coupled to the plurality of refrigerant flow-in/out holes and through which the introduced refrigerant flows in/out; and a pad coupled to the pad gear so that the pad is rotatable with respect to the boss to selectively open or close the plurality of flow-in/out holes, the pad including:

an open cavity formed therein to selectively open one of the plurality of refrigerant flow-in/out holes, and a connection cavity formed therein to selectively connect one or two of the plurality of refrigerant flow-in/out holes, wherein the connection cavity is a closed cavity which is not directly opened to the receiving space, and the open cavity and the connection cavity are formed on a bottom surface of the pad facing the boss.

* * * * *